(12) United States Patent
Vermilye et al.

(10) Patent No.: US 9,810,803 B2
(45) Date of Patent: Nov. 7, 2017

(54) METHOD FOR SUBSURFACE MAPPING USING SEISMIC EMISSIONS

(71) Applicants: Jan Meredith Vermilye, Lyons, CO (US); Charles John Sicking, Plano, TX (US); Ross G. Peebles, Houston, TX (US); Laird Berry Thompson, Lake Oswego, OR (US); Amanda Jean Klaus, Boulder, CO (US); Peter Anderson Geiser, Lyons, CO (US)

(72) Inventors: Jan Meredith Vermilye, Lyons, CO (US); Charles John Sicking, Plano, TX (US); Ross G. Peebles, Houston, TX (US); Laird Berry Thompson, Lake Oswego, OR (US); Amanda Jean Klaus, Boulder, CO (US); Peter Anderson Geiser, Lyons, CO (US)

(73) Assignee: Seismic Global Ambient, LLC, Missouri City, TX (US)

( * ) Notice: Subject to any disclaimer, the term of this patent is extended or adjusted under 35 U.S.C. 154(b) by 615 days.

(21) Appl. No.: 14/297,394

(22) Filed: Jun. 5, 2014

(65) Prior Publication Data
US 2014/0288840 A1    Sep. 25, 2014

Related U.S. Application Data

(63) Continuation-in-part of application No. 13/831,591, filed on Mar. 15, 2013, now Pat. No. 9,389,326,
(Continued)

(51) Int. Cl.
*G01V 1/06* (2006.01)
*G01V 1/42* (2006.01)
(Continued)

(52) U.S. Cl.
CPC .............. *G01V 1/42* (2013.01); *G01V 1/288* (2013.01); *G01V 1/345* (2013.01); *G01V 2210/1234* (2013.01); *G01V 2210/65* (2013.01)

(58) Field of Classification Search
USPC .............................................. 367/9
See application file for complete search history.

(56) References Cited

U.S. PATENT DOCUMENTS 5,390,291 A * 2/1995 Ohashi ............... G06T 17/00
345/419
5,884,229 A * 3/1999 Matteucci ............ G01V 1/30
702/14
(Continued)

*Primary Examiner* — James Hulka
(74) *Attorney, Agent, or Firm* — Edward Eugene Thigpen

(57) ABSTRACT

The invention comprises a method for mapping a volume of the Earth's subsurface encompassing a selected path within said volume, comprising dividing the volume of the Earth's subsurface into a three-dimensional grid of voxels and transforming detected seismic signals representing seismic energy originating from said volume of the Earth's subsurface when no induced fracturing activity is occurring along said selected path and conducted to a recording unit for recording into signals representing energy originating from the voxels included in said grid of voxels, and utilizing said transformed seismic signals to estimate spatially continuous flow paths for reservoir fluids through said volume of the Earth's subsurface to said selected path.

18 Claims, 6 Drawing Sheets

Related U.S. Application Data which is a continuation-in-part of application No. 13/070,442, filed on Mar. 23, 2011, application No. 14/297,394, which is a continuation-in-part of application No. 13/831,619, filed on Mar. 15, 2013, now Pat. No. 9,442,205, which is a continuation-in-part of application No. 13/070,442, filed on Mar. 23, 2011.

(60) Provisional application No. 61/778,358, filed on Mar. 12, 2013.

(51) Int. Cl.
*G01V 1/28* (2006.01)
*G01V 1/34* (2006.01)

(56) References Cited

U.S. PATENT DOCUMENTS

| | | | |
|---|---|---|---|
| 6,389,361 B1 | 5/2002 | Geiser | |
| 6,516,274 B2* | 2/2003 | Cheng | G01V 1/288 702/14 |
| 6,985,816 B2* | 1/2006 | Sorrells | G01V 1/30 702/14 |
| 7,069,149 B2* | 6/2006 | Goff | G01V 1/30 702/16 |
| 7,127,353 B2 | 10/2006 | Geiser | |
| 7,391,675 B2* | 6/2008 | Drew | G01V 1/008 367/40 |
| 7,660,199 B2 | 2/2010 | Drew | |
| 7,663,970 B2* | 2/2010 | Duncan | G01V 1/288 181/112 |
| 8,360,144 B2* | 1/2013 | Imhof | G01V 1/30 166/250.01 |
| 9,001,619 B2* | 4/2015 | Diller | G01V 1/288 367/14 |
| 9,075,158 B2* | 7/2015 | Geiser | G01V 1/288 |
| 9,194,967 B2* | 11/2015 | Lacazette | G01V 1/288 |
| 9,389,326 B2* | 7/2016 | Vermilye | G01V 1/42 |
| 2003/0112704 A1* | 6/2003 | Goff | G01V 1/30 367/72 |
| 2004/0014212 A1* | 1/2004 | Elliott | A61K 9/0024 435/373 |
| 2004/0151356 A1* | 8/2004 | Li | G06K 9/527 382/131 |
| 2008/0043024 A1* | 2/2008 | Schiwietz | G06T 11/006 345/442 |
| 2009/0076388 A1* | 3/2009 | Napoli | A61B 8/0833 600/437 |
| 2009/0122061 A1* | 5/2009 | Hammon, III | G01V 1/302 345/424 |
| 2010/0149917 A1* | 6/2010 | Imhof | G01V 1/32 367/53 |
| 2010/0161232 A1* | 6/2010 | Chen | G01V 1/32 702/16 |
| 2011/0002194 A1* | 1/2011 | Imhof | G01V 1/32 367/53 |
| 2011/0042098 A1* | 2/2011 | Imhof | G01V 1/30 166/369 |
| 2011/0048731 A1* | 3/2011 | Imhof | G01V 1/32 166/369 |
| 2012/0090834 A1* | 4/2012 | Imhof | G01V 1/32 166/250.01 |
| 2012/0243368 A1* | 9/2012 | Geiser | G01V 1/42 367/9 |
| 2013/0100770 A1 | 4/2013 | Diller et al. | |
| 2013/0128693 A1* | 5/2013 | Geiser | G01V 1/288 367/27 |
| 2013/0128694 A1 | 5/2013 | Lacazette et al. | |
| 2013/0201787 A1* | 8/2013 | Vermilye | G01V 1/42 367/9 |
| 2013/0215712 A1* | 8/2013 | Geiser | G01V 1/288 367/9 |
| 2016/0231444 A1* | 8/2016 | Lacazette | G01V 1/288 |

\* cited by examiner

METHOD FOR SUBSURFACE MAPPING USING SEISMIC EMISSIONS

CROSS-REFERENCE TO RELATED APPLICATIONS

This application is a continuation-in-part of, and claims priority from U.S. patent application Ser. No. 13/831,591 entitled "Methods, Systems and Devices for Near-Well Fracture Monitoring Using Tomographic Fracture Imaging Techniques" to Vermilye et al. filed Mar. 15, 2013, which was a continuation-in-part of, and claimed priority from U.S. patent application Ser. No. 13/070,442 entitled "Fracture Imaging Methods Employing Skeletonization of Seismic Emission Tomography Data" to Geiser et al. filed Mar. 23, 2011, and also claimed priority from U.S. Provisional Patent Application Ser. No. 61/778,358 entitled "Method for Assessing the Effectiveness of Modifying Transmissive Networks of Natural Reservoirs" to Geiser et al. filed Mar. 12, 2013. This application is also a continuation-in-part of, and claims priority from U.S. patent application Ser. No. 13/831, 619 entitled Method for Assessing the Effectiveness of Modifying Transmissive Networks of Natural Reservoirs to Geiser et al. filed on Mar. 15, 2013 which was a continuation-in-part of, and claimed priority from U.S. patent application Ser. No. 13/070,442 entitled "Fracture Imaging Methods Employing Skeletonization of Seismic Emission Tomography Data" to Geiser et al. filed Mar. 23, 2011, and also claimed priority from U.S. Provisional Patent Application Ser. No. 61/778,358 entitled "Method for Assessing the Effectiveness of Modifying Transmissive Networks of Natural Reservoirs" to Geiser et al. filed Mar. 12, 2013.

STATEMENT REGARDING FEDERALLY SPONSORED RESEARCH OR DEVELOPMENT

Not applicable.

BACKGROUND OF INVENTION

Field of the Invention

The invention relates generally to the field of seismic data acquisition and processing. More specifically, the invention relates to systems and methods for acquiring and processing passive seismic data, typically referred to as passive seismic emission tomography.

Background Art

Passive seismic emission tomography ("SET") is a process in which an array of seismic sensors is deployed in a selected pattern on or near the Earth's surface, or in a wellbore, and seismic energy that emanates from within the Earth's subsurface is detected by the sensors. The sensor output signals are processed to reveal various characteristics of the Earth's subsurface. Applications for passive seismic emission tomography have included determining movement of reservoir fluids in subsurface petroleum producing reservoirs, and monitoring of movement of proppant-carrying fluid injected into subsurface reservoirs to increase the flow of production fluids.

SUMMARY OF INVENTION

The invention comprises a method for mapping a volume of the Earth's subsurface encompassing a selected path within said volume, comprising dividing the volume of the Earth's subsurface into a three-dimensional grid of voxels and transforming detected seismic signals representing seismic energy originating from said volume of the Earth's subsurface when no induced fracturing activity is occurring along said selected path and conducted to a recording unit for recording into signals representing energy originating from the voxels included in said grid of voxels, and utilizing said transformed seismic signals to map spatially continuous flow paths for reservoir fluids through said volume of the Earth's subsurface to said selected path.

Other aspects and advantages of the invention will be apparent from the following description and the appended claims.

DETAILED DESCRIPTION

The invention will now be described in detail with reference to the accompanying drawings. In describing the examples, specific details are set forth in order to provide a thorough understanding of the invention. However, it will be apparent to those skilled in the art that the invention may be practiced without some or all of such specific details. In other instances, well-known features and/or process steps have not been described in detail so as not to unnecessarily obscure the invention.

Generally, in a method according to the invention, an array of seismic sensors is deployed in a selected pattern on the Earth's surface and seismic energy that emanates from various seismic events occurring in the Earth's subsurface is detected by the sensors to generate "passive" seismic signals to image a selected volume in the Earth's subsurface. "Passive" seismic signals are thus distinguishable from "active" or "controlled source" seismic signals, which are produced by actuating a seismic energy source having controllable actuation timing, and in many cases controllable spectral content. Passive recordings are typically continuous for long periods of time (hours or days), whereas active seismic methods record only for the time during which a signal is being generated and the signal travels downwardly in the subsurface, is reflected from subsurface reflecting interfaces and back to the surface (typically 20 seconds or less for each recording cycle). Methods that use passive seismic signals to image the Earth's subsurface are typically referred to as seismic emission tomography ("SET"). Examples of SET techniques and processes are described in U.S. Pat. No. 6,389,361, issued on May 14, 2002, to Geiser; U.S. Pat. No. 7,127,351, issued on Oct. 24, 2006 to Geiser; U.S. patent application Ser. No. 13/070,442, filed on Mar. 24, 2011 to Geiser et al., U.S. patent application Ser. No. 13/831,591, filed on Mar. 15, 2013 to Vermilye et al., and U.S. patent application Ser. No. 13/831,619, filed on Mar. 15, 2013 to Geiser et al., each of which are incorporated herein by reference.

Figure 1A:
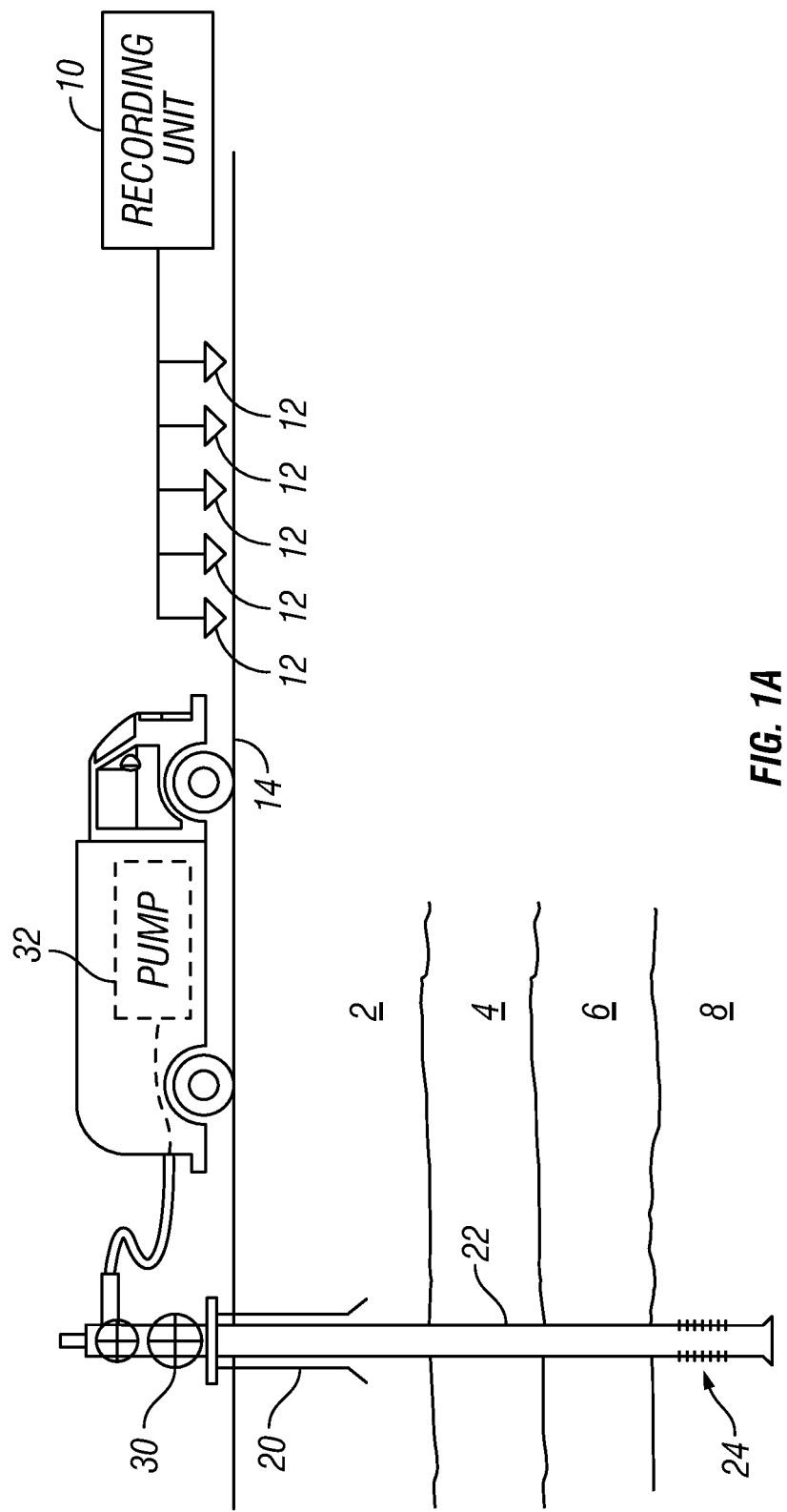
FIGS. 1A and 1B illustrate an example of the invention performed in a wellbore.
Figure 1B:
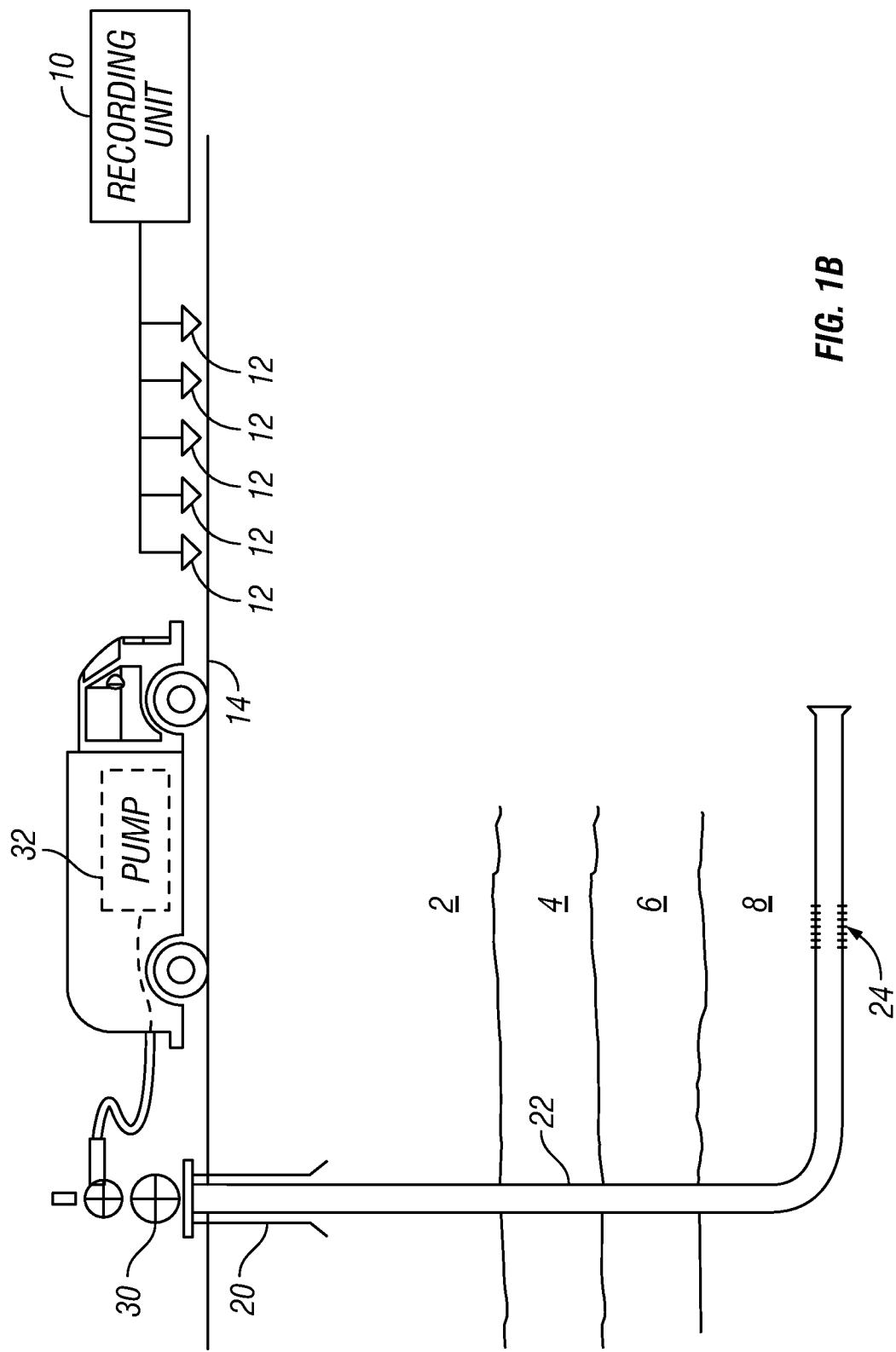

FIGS. 1A and 1B each show a wellbore 20 drilled through subsurface formations 2, 4, 6 and 8. In this example, one of the subsurface formations, shown as formation 8 may be a hydrocarbon producing formation. A wellbore tubing 22 including perforations 24 for receiving fluid from the hydrocarbon producing formation 8 is deployed in the wellbore 20. The wellbore tubing 22 is connected to a surface wellhead 30 including an assembly of valves (not indicated separately) for controlling fluid flow. Wellhead 30 may be connected to pumping unit 32, which may be used for pumping fluid down the wellbore 22 into the subsurface formations, particularly hydrocarbon producing formation 8. FIG. 1A shows a vertical well. FIG. 1B is the same as FIG. 1A, except that FIG. 1B illustrates a horizontal well. Drilling technology has evolved to allow wells to be drilled along virtually any direction or azimuth. By drilling horizontally or non-vertically through a formation, the extent of the formation in contact with the wellbore can be much greater than is possible with vertically drilled wells, thereby increasing significantly the total volume of the subsurface from which hydrocarbons can be produced.

Typically, wellbore 20 is subjected to a fracturing operation in which hydraulic fracturing fluid is injected into wellbore 20 through perforations 24 and into geologic formation 8. In the fracturing operation, the wellhead 30 may be hydraulically connected to a fracture pumping unit 32. The fracture pumping unit 32 pumps fluid down the wellbore 20 and into the subsurface formations, particularly the hydrocarbon producing formation 8, through perforations 24. The movement of fluid into the hydrocarbon producing formation 8 at a pressure which exceeds the fracture pressure of the hydrocarbon producing formation 8 causes the formation to rupture and develop fissures. The fracture pressure is generally related to the overburden pressure, i.e., the pressure exerted by the weight of all the formations above the hydrocarbon producing formation. The fluid pumped into the hydrocarbon producing formation 8 will normally include proppants, i.e., solid particles having a selected size. In propped fracturing operations, the particles of the proppant move into fissures formed in the hydrocarbon producing formation 8 and remain in the fissures after the fluid pressure is reduced below the fracture pressure of the formation, thereby propping the fissures open for subsequent fluid production from the hydrocarbon producing formation, thus substantially increasing the productive capacity of the wellbore 20.

In accordance with the present invention passive seismic imaging is utilized for mapping spatially continuous flow paths for reservoir fluids through a volume of the Earth's subsurface to a selected path during a time when no induced fracturing activity is occurring along said selected path. The term "fluid" is intended to include liquids and gases and combinations thereof. Typically the selected path is one that may be under consideration as a location for drilling a wellbore. The selected path may also be a segment of an existing wellbore. In an embodiment of the invention these spatially continuous flow paths are determined by mapping the locations from which high levels of seismic energy are being emitted, indicating the presence of fractures in the reservoir rock. Fractured rock is conducive to the flow of reservoir fluids. When the invention is performed with respect to a potential wellbore location or in an actual wellbore prior to induced fracturing of the wellbore, the fractured rock will be the result of naturally occurring fractures, or possibly the result of induced fracturing activity in a nearby wellbore. If the invention is performed in a wellbore following induced fracturing, the fractures may also be the result of induced fractures. Mapping of these spatially continuous flow paths permits an estimation of the production volume of a wellbore or potential wellbore in the Earth's subsurface. The volume of the Earth's subsurface that is substantially filled with the determined spatially continuous flow paths substantially comprises the production volume.

FIGS. 1A and 1B each show an array of sensors 12 arranged proximate to the Earth's surface 14 to detect seismic energy originating from the subsurface. In marine applications, the array of seismic sensors 12 could be arranged at or proximate to the water bottom in a cable device known as an "ocean bottom cable". Data acquisition configurations other than that shown in FIGS. 1A and 1B may be employed. For example, surface sensors may be employed in conjunction with downhole sensors, and downhole sensors may be employed in another wellbore in addition to, or instead of, wellbore 20.

The seismic sensors 12 generate electrical, magnetic or optical signals in response to detected particle motion, velocity or acceleration. A recording unit 10 is in signal communication with the seismic sensors 12 for making a time-indexed recording of the seismic signals detected by each seismic sensor 12. In some examples the seismic sensors 12 are geophones, In other examples, the seismic sensors 12 may be accelerometers or other sensing devices known in the art that are responsive to motion, velocity or acceleration of the Earth's surface or formations proximate to the particular sensor. Some types of seismic sensors may include a plurality of mutually orthogonally arranged particle motion responsive sensing elements to detect particle motion along different directions, for example, shear wave motion. Accordingly, the type of seismic sensor is not a limit on the scope of the present invention.

In one example, the seismic sensors may be arranged in a radially extending, spoke-like pattern, with the center of the pattern disposed approximately about the surface position of the wellbore 20. In this example, the sensors 12 are arranged in directions substantially along a direction of propagation of acoustic energy that may be generated by noise sources near the wellhead 30, which may be attenuated by frequency-wavenumber (fk) filtering. The seismic sensors 12 may also be arranged in other configurations, such as, for example, the orthogonal array configuration illustrated in U.S. patent application Ser. No. 13/277,189, filed on Oct. 19, 2011 to Riley et al., which is incorporated herein by reference.

In some examples, the seismic sensors 12 may be arranged in sub-groups, with spacing between individual sensors in each of the sub-groups being less than about one-half the expected wavelength of the seismic energy from the Earth's subsurface that is intended to be detected. Signals from all the seismic sensors 12 in one or more of the sub-groups may be added or summed to reduce the effects of noise in the detected signals.

The seismic signals recorded from each of the sensors 12 may be processed first by certain procedures well known in the art of seismic data processing, including the summing described above, and various forms of filtering and other processing techniques for noise reduction and/or signal enhancement known to those of ordinary skill in the art.

Figure 6:
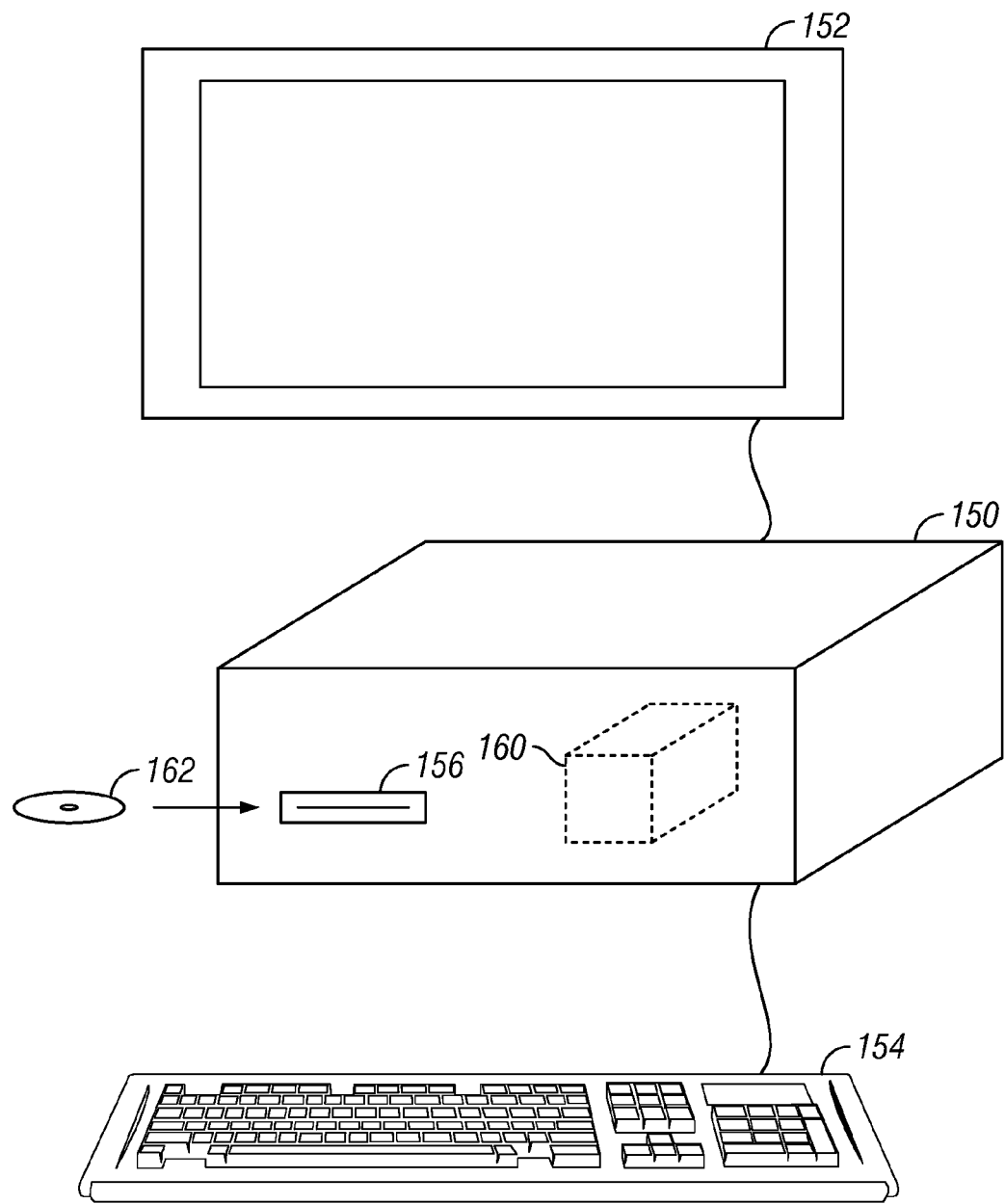
FIG. 6 shows a programmable computer, display and computer readable media.

The recording unit 10 may include (not shown separately) a general purpose programmable computer or a dedicated program computer including data storage and display devices, discussed further with respect to FIG. 6, that may perform a process according to the present invention and store and/or display the results of the process. However, the type of computer used to implement the invention and the type of display and/or storage devices are not limits on the scope of the present invention. In other embodiments, signals generated by sensors 12 may be transmitted by wireless transmitters to a receiver operably connected to recording unit 10. In still other embodiments, the electrical, magnetic and/or optical signals generated by sensors 12 are stored as data in solid state or other memory or recording devices associated with one or more sensors 12.

Data recorded by data recording system 10 is typically, although not necessarily, in the form of digitally sampled time series referred to as seismic traces, with one time series or seismic trace for each sensor 12. Each value in the time series is recorded at a known time and represents the value of the seismic energy sensed by the sensor 12 at that time. The data are recorded over a period of time referred to as the data acquisition time period. The data acquisition time period varies depending on the objective of the seismic survey. In practicing the method of the present invention data may be recorded over a time period which may typically be a few hours. However, the data acquisition time period is not a limitation of the invention.

The rate at which data are recorded for each seismic trace for each of the sensors 12 may also be varied in accordance with the objectives of the survey and the frequency of the seismic energy generated in the formation. For example, if frequencies less than or equal to 125 Hz are expected to be sensed or measured, data may be sampled at a rate of 2.0 milliseconds ("ms") for each trace to ensure aliasing does not occur. Other sample rates are also possible such as 0.25 ins, 0.5 ms, 4 ms, 8 ms, 16 ms and so on. It is usual to record more data than is required for a given survey objective. Once the seismic data have been recorded, they must be processed and converted to produce a useful display of information.

Figure 2A:
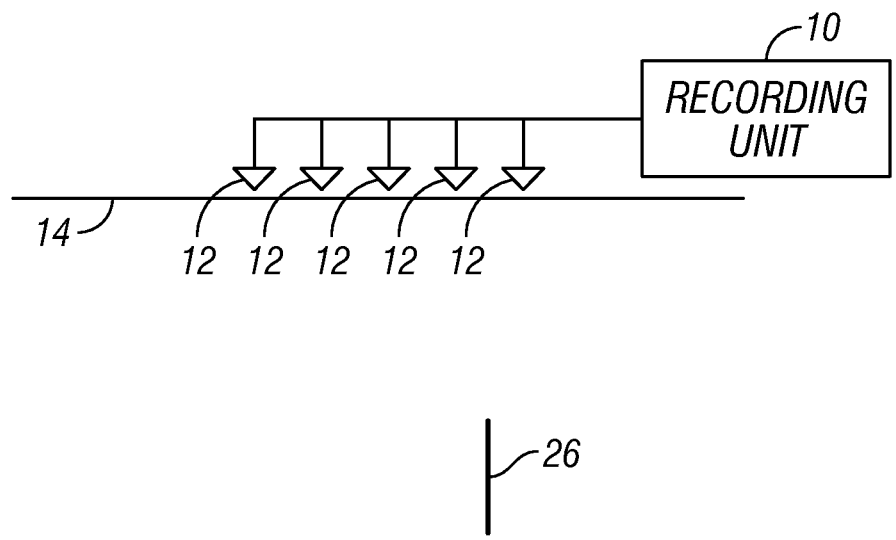
FIGS. 2A and 2B illustrate a further example of the invention performed with respect to a selected path in the subsurface independently of a wellbore location.
Figure 2B:
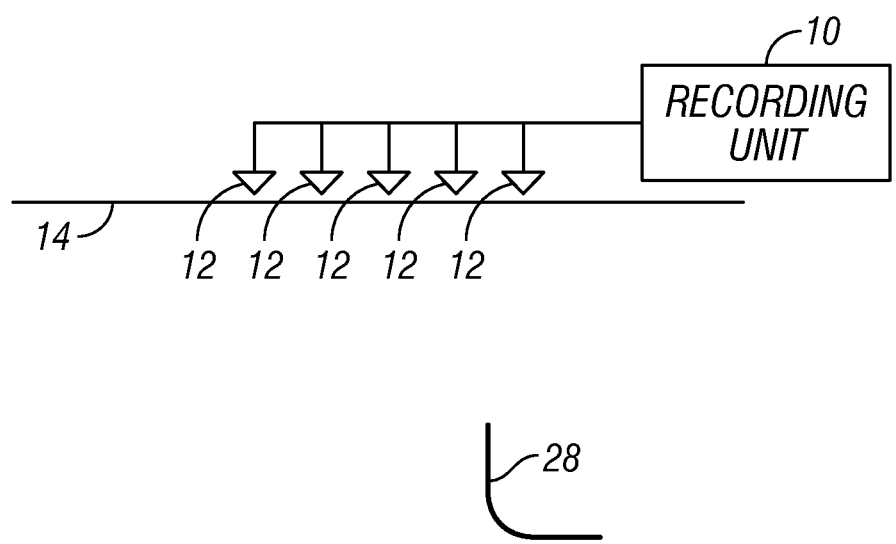

In accordance with an embodiment of this invention, there is provided a system for imaging the spatially continuous flow paths contributing to the production volume of a selected path within the Earth's subsurface. The selected path may be a linear path, such as path 26 shown in FIG. 2A, or a nonlinear path such as path 28 shown in FIG. 2B. Such linear or nonlinear paths may be the location of a segment of an actual wellbore or a potential wellbore. By "production volume" is meant the volume substantially filled with a network of spatially continuous fluid flow paths that are directly connected to a wellbore. For a wellbore that is in production, the production volume will typically be referred to as the "active production volume". For a potential wellbore location this volume will typically be referred to as the "potential production volume". The invention may be performed with respect to a selected path within the Earth's subsurface independently of the location of a wellbore, or it may be performed on a wellbore at a time preceding the fracturing of the well, as well as during production following the well fracturing process. The method employs a seismic emission tomography (SET) data set, comprising a plurality of data traces recorded over a selected data acquisition time period. The data is acquired with a plurality of sensors located at a plurality of sensor positions disposed in proximity to a selected path in the Earth's subsurface, as shown in FIGS. 2A and 2B, which may be segments of a borehole, as illustrated in FIGS. 1A and 1B.

Figure 3:
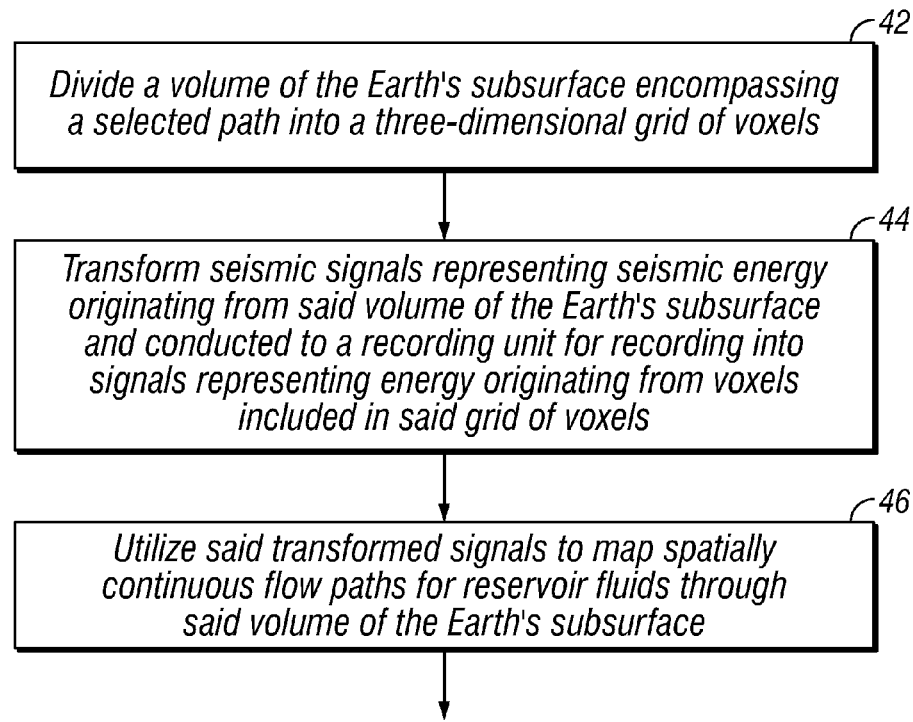
FIG. 3 is a flow chart of an example method for performing the invention.

FIG. 3 is a flow chart that illustrates an embodiment of the invention. In element 42, a volume of the Earth's subsurface that encompasses a selected path is divided into a three-dimensional grid of voxels. The selected path may be a linear path or a nonlinear path, and may be a segment of an actual wellbore or a potential wellbore. In element 44, seismic signals representing seismic energy originating from said volume of the Earth's subsurface are detected and conducted to a recording unit for recording are transformed into signals representing the energy originating from voxels included in said grid of voxels. The detected signals are typically either electrical, magnetic or optical signals, and represent measured seismic magnitude. In element 46, said transformed signals are utilized to map spatially continuous flow paths for reservoir fluids through said volume of the Earth's subsurface.

Figure 4:
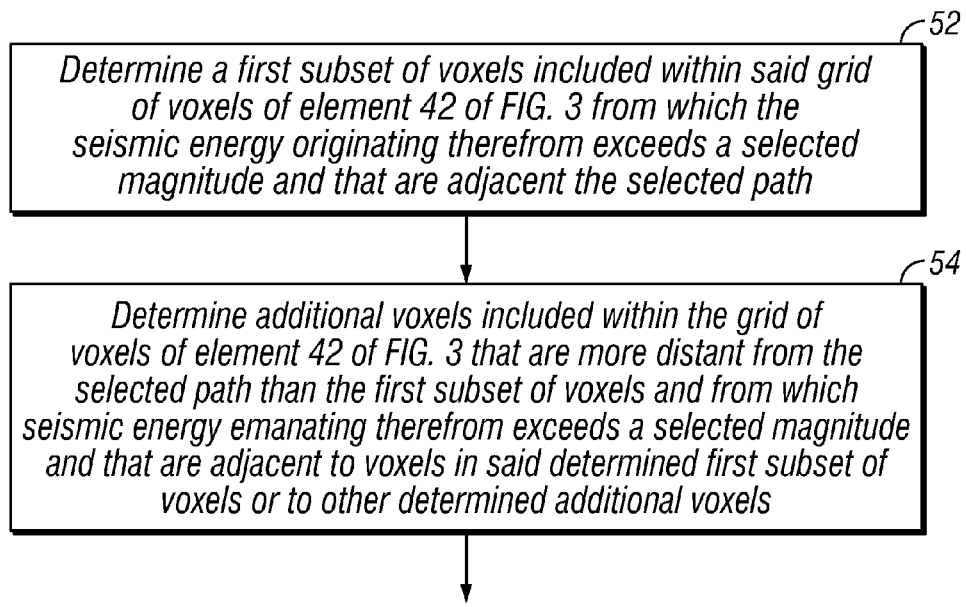
FIG. 4 is a more detailed flow chart of a method for performing the invention.

FIG. 4 is a flow chart that illustrates an implementation of element 46 of FIG. 3. In element 52 of FIG. 4, a first subset of voxels included within said grid of voxels is determined. Said first subset of voxels includes voxels from which the seismic energy originating therefrom exceeds a selected magnitude and that are adjacent the selected path. By "adjacent" is meant voxels that either abut the selected path or that encompass the selected path. The determined first subset of voxels identifies potential flow paths for reservoir fluids through said volume of the Earth's subsurface to said selected path. In steps 54 additional voxels included within said grid of voxels that are more distant from the selected path than said first subset of voxels and from which seismic energy originating therefrom exceeds a selected magnitude and that are adjacent to voxels in said determined first subset of voxels or to other determined additional voxels are determined, to map spatially continuous flow paths for reservoir fluids through said volume of the Earth's subsurface to said selected path. These spatially continuous flow paths define the production volume for a wellbore that occupies the selected path or that may be drilled along the selected path.

Figure 5:
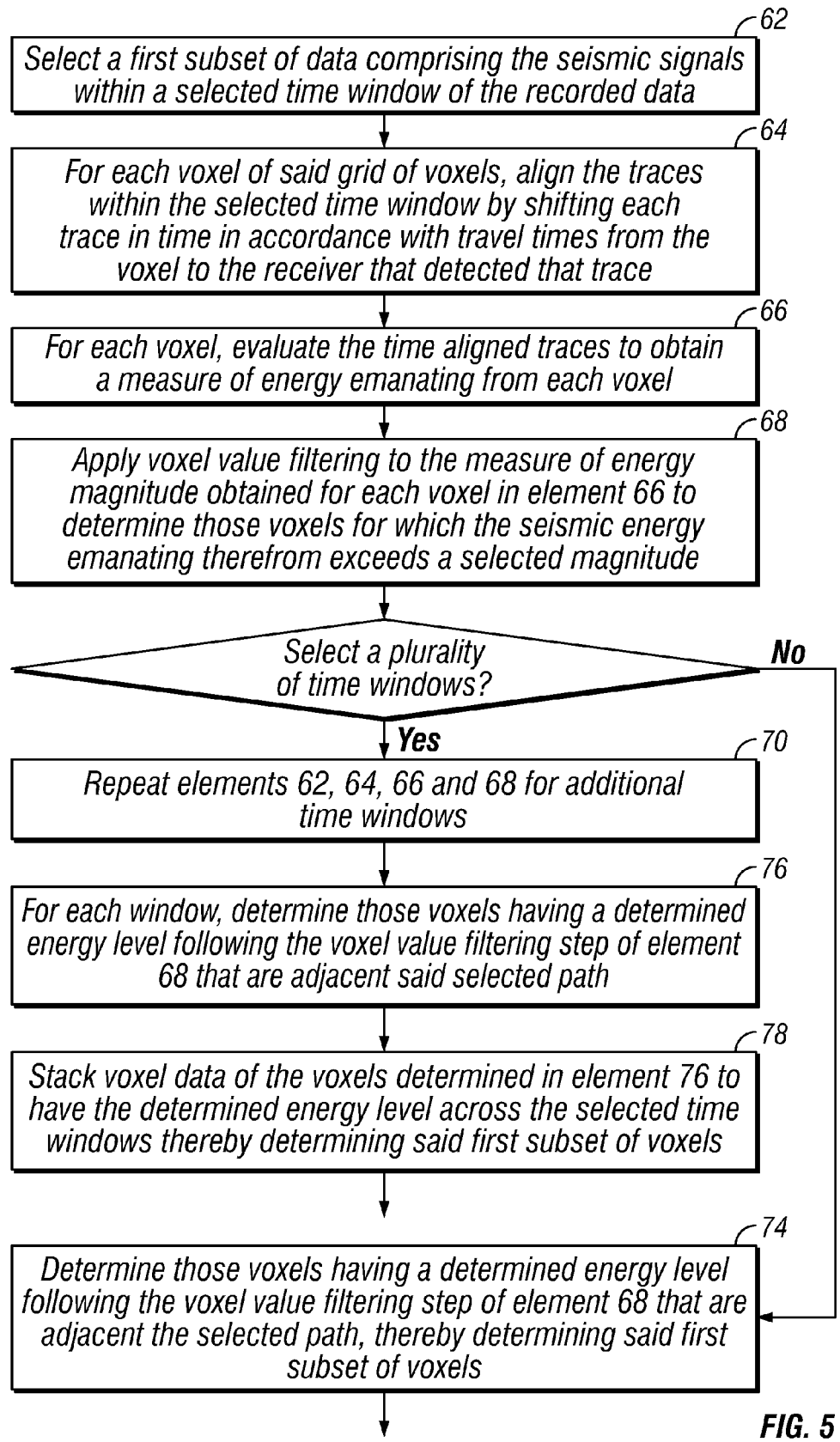
FIG. 5 is another more detailed flow chart of a method for performing the invention.

FIG. 5 is a flow chart that illustrates a detailed process by which element 52 of FIG. 4 may be performed. In step 62, a first subset of data comprising the seismic signals within a selected time window of the recorded seismic data is selected. In step 64, for each voxel of said grid of voxels, seismic signal traces within the selected time window are aligned by shifting each trace in time in accordance with travel times from the voxel to the receiver that detected that trace. In step 66, for each voxel the time aligned traces are evaluated to determine a measure of energy emanating from each voxel. The energy emitted from each voxel during a given time window may be represented by different attributes of the data, including, but not limited to, semblance, amplitude, absolute amplitude, reflection strength (the amplitude of the envelope of the seismic wave), frequency, and other attributes of seismic data which will be apparent to those of ordinary skill in the art. In one embodiment, voxel values are computed on the basis of semblance values.

In step 68 voxel value filtering is applied to the measure of energy magnitude obtained for each voxel in 66 to determine those voxels for which the seismic energy emanating therefrom exceeds a selected magnitude. In this context "voxel filtering" means sorting, restricting or limiting the voxel values which are employed in subsequent steps, and may not mean changing the value of any voxel by applying filters to individual data values. The objective is to improve the result by only including data values corresponding to releases of seismic energy, while eliminating data values that are likely to correspond to random noise spikes or low level background noise. There are many ways of selecting voxel value limits or "voxel filtering", including but not limited to passing voxel values that exceed a predetermined minimum value, or filtering the data subset to pass a predetermined percentage of the voxel having the greatest amplitude.

In one implementation of the invention only a single time window of data is utilized, in which case following element 68, element 74 is performed in which those voxels having a determined energy level following the voxel value filtering step of step 68 that are adjacent said selected path are determined, thereby determining said first subset of voxels.

In another implementation of the invention, data from a plurality of time windows are utilized, and following element 68, as indicated in element 70, elements 62, 64, 66 and 68 are repeated for at least an additional time window, and in element 76, for each time window, those voxels having a determined energy level following the voxel value filtering step of element 68 that are adjacent said selected path are determined. In element 78 voxel data of the voxels determined in element 76 to have the determined energy level are stacked across the selected time windows to determine said first subset of voxels.

After said first subset of voxels is determined in accordance with element 74 of FIG. 5, in accordance with element 54 of FIG. 4, additional voxels included within said grid of voxels defined in element 42 of FIG. 3 that are more distant from the selected path than the first subset of voxels and from which seismic energy originating therefrom exceeds a selected magnitude and that are adjacent to voxels in said first subset of voxels or adjacent to other determined additional voxels are determined. The same process that is used for determining said first subset of voxels comprising voxels that are adjacent the selected path is utilized for determining said additional voxels, except that voxels from which seismic energy originating therefrom exceeds a selected magnitude and that are adjacent said first subset of voxels are determined.

Following determination of the first subset of voxels and said additional voxels, these voxels are utilized to map spatially continuous flow paths for reservoir fluids through the Earth's subsurface to said selected path.

Typically, the process of determining the first subset of voxels and the second subset of voxels and the additional voxels referred to with reference to FIG. 4 is an iterative process. Following the determination of a first tier of voxels from which seismic energy emanating therefrom exceeds a selected magnitude and are adjacent the selected path (thus forming a part of the spatially continuous flow paths for reservoir fluids to the selected path), a second tier of voxels that are adjacent to voxels in said first tier of voxels and from which seismic energy emanating therefrom exceeds a selected magnitude are then determined. Similarly, a third tier of voxels, and so on, are determined, each of which have seismic energy emanating therefrom that exceeds a selected magnitude and that are adjacent other voxels in the preceding tier of voxels that comprise a part of the spatially continuous flow paths for reservoir fluids to the selected path. This process will normally continue until no more voxel are identified that contribute to the spatially continuous flow paths. However, the determination of said first subset of voxels and said additional voxels is not intended to be limited to an iterative process.

The process described above and outlined in FIGS. 3, 4 and 5 may be implemented in a number of embodiments. The SET data set used for performing the process may be recorded for either a linear or nonlinear selected path through the Earth's subsurface. The selected path may be a segment of an existing wellbore or a potential wellbore.

The process described above and outlined in FIGS. 3, 4 and 5 may also be performed at different spaced-apart times to determine changes in production volume of a wellbore.

The foregoing embodiments of methods according to the various aspects of the invention may be performed by a suitable programmed general purpose computer. As example of such a computer having a central processor 150 is shown in FIG. 4. The processor 150 is coupled to a user input device 154 such as a keyboard, and is coupled to a display 152 such as a flat panel liquid-crystal display (LCD). A computer program according to this aspect of the invention may reside on any one of a number of types of computer readable medium, such as compact disk 162 insertable into a CD reader 156 or the program may reside in a hard drive 160 within or remote from the processor 150. The program includes logic operable to cause a programmable computer to perform the data processing sequences described above with reference to FIG. 1. The particular embodiment in which a computer program is stored is not meant to limit the scope of the invention. The computer may form part of the recording unit (10 in FIG. 1) or may be another computer.

In another aspect, the invention relates to computer readable media storing thereon a computer program for carrying out the method described above with reference to FIGS. 2 and 3. Referring to FIG. 4, the foregoing process as explained with reference to FIGS. 2 and 3 can be embodied in computer-readable code. The code can be stored on a computer readable medium, such as CD-ROM 164 or a magnetic hard drive 160 forming part of a general purpose programmable computer. The computer, as known in the art, includes a central processing unit 150, a user input device such as a keyboard 154 and a user display 152 such as a flat panel LCD display. According to this aspect of the invention, the computer readable medium includes logic operable to cause the computer to execute acts as set forth above and explained with respect to the previous figures.

Typically the spatially continuous flow paths and/or the production volume maps generated according to the present invention will be displayed on a user display such as a flat panel LCD display or printed as a tangible copy. The purposes of this invention are for guidance in determining where to drill a wellbore for producing hydrocarbons and in managing the production of existing wells.

While the invention has been described with respect to a limited number of embodiments, those skilled in the art having the benefit of this disclosure, will appreciate that other embodiments can be devised which do not depart from the scope of the invention as disclosed herein. Accordingly, the scope of the invention should be limited only by the attached claims.

What is claimed is:

1. A method for determining the reservoir fluid production volume within a selected volume of the Earth's subsurface encompassing a selected path when no induced fracturing is occurring along said selected path, comprising:

detecting seismic signals with seismic sensors arranged proximate the Earth's surface in proximity to said selected path when no induced fracturing is occurring along said selected path, said detected seismic signals representing seismic energy being emitted from said selected volume of the Earth's subsurface, said seismic sensors generating at least one of electrical, magnetic or optical signals;

recording said detected seismic signals in a recording unit;

dividing said selected volume of the Earth's subsurface into a three-dimensional grid of voxels;

processing said recorded seismic signals to determine a first subset of voxels included within said grid of voxels, said first subset of voxels including voxels from which the detected seismic energy originating therefrom exceeds a selected magnitude and that are adjacent said selected path, said determined first subset of voxels identifying potential flow paths for reservoir fluids through said selected volume of the Earth's subsurface to said selected path; and processing said recorded seismic signals to determine additional voxels included within said grid of voxels that are more distant from the selected path than said first subset of voxels and from which seismic energy originating therefrom exceeds a selected magnitude and that are adjacent to voxels in said determined first subset of voxels or to other determined additional voxels, said determined additional voxels identifying potential flow paths for reservoir fluids through said selected volume of the Earth's subsurface to said selected path; and generating a map comprising said first subset of voxels and said additional voxels, thereby generating a map of spatially continuous flow paths for reservoir fluids through said selected volume of the Earth's subsurface to said selected path during a time when no induced fracturing is occurring along said selected path, the portion of said selected volume of the Earth's subsurface substantially filled with said spatially continuous flow paths being the reservoir fluid production volume.

2. The method of claim 1 wherein said selected path comprises a substantially linear path.

3. The method of claim 1 wherein said selected path comprises a nonlinear path.

4. The method of claim 1 wherein said selected path comprises the location of at least a segment of a wellbore.

5. The method of claim 4 wherein the wellbore is in production.

6. The method of claim 1 wherein said selected path comprises the location of at least a segment of a potential wellbore.

7. The method of claim 1 wherein determining said first subset of voxels comprises:
(i) selecting a subset of data comprising seismic signal traces within a selected time window of the recorded data;
(ii) for each voxel of said grid of voxels, time aligning the seismic signal traces within the selected time window by shifting each trace in time in accordance with travel times from the voxel to the receiver that detected that trace;
(iii) for each voxel, evaluating the time aligned traces to obtain a measure of the energy magnitude emanating from each voxel;
(iv) applying voxel value filtering to the measure of energy magnitude obtained for each voxel in element (iii) to determine those voxels for which the seismic energy emanating therefrom exceeds a selected magnitude;
(v) generating a second subset of data comprising those voxels having a determined energy level following the voxel value filtering step of element (iv) that are adjacent said selected path, thereby determining said first subset of voxels.

8. The method of claim 7 wherein evaluating the time aligned traces to obtain a measure of the energy magnitude emanating from each voxel comprises summing the time aligned traces.

9. The method of claim 7 wherein evaluating the time aligned traces to obtain a measure of the energy magnitude emanating from each voxel comprises applying a semblance process.

10. The method of claim 7 wherein evaluating the time aligned traces to obtain a measure of the energy magnitude emanating from each voxel comprises applying a coherence process.

11. The method of claim 7 wherein evaluating the time aligned traces to obtain a measure of the energy magnitude emanating from each voxel comprises applying a correlation process.

12. The method of claim 1 wherein the determination of said first subset of voxels and said additional voxels is an iterative process in which a first tier of voxels from which seismic energy emanating therefrom exceeds a selected magnitude and are adjacent the selected path, is determined, and a second tier of voxels that are adjacent to voxels in said first tier of voxels and from which seismic energy emanating therefrom exceeds a selected magnitude is determined, and further tiers of voxels, each of which have seismic energy emanating therefrom that exceed a selected magnitude and are adjacent voxels in the preceding tier of voxels are determined.

13. The method of claim 1 wherein determining said first subset of voxels comprises:
(i) selecting a subset of data comprising seismic signal traces within a selected time window of the recorded data;
(ii) for each voxel of said grid of voxels, time aligning the seismic signal traces within the selected time window by shifting each trace in time in accordance with travel times from the voxel to the receiver that detected that trace;
(iii) for each voxel, evaluating the time aligned traces to obtain a measure of the energy magnitude emanating from each voxel;
(iv) applying voxel value filtering to the measure of energy magnitude obtained for each voxel in element (iii) to determine those voxels for which the seismic energy emanating therefrom exceeds a selected magnitude and that are adjacent said selected path;
(v) repeating elements (i) through (iv) for additional time windows;
(vi) for each time window determining those voxels having a determined energy level following the voxel value filtering step of element (iv) that are adjacent said selected path; and
(vii) stacking data of the voxels determined in element (vi) to have the determined energy level across the selected time windows, thereby determining said first subset of voxels.

14. The method of claim 13 wherein evaluating the time aligned traces to obtain a measure of the energy magnitude emanating from each voxel comprises summing the tine aligned traces.

15. The method of claim 13 wherein evaluating the time aligned traces to obtain a measure of the energy magnitude emanating from each voxel comprises applying a semblance process.

16. The method of claim 13 wherein evaluating the time aligned traces to obtain a measure of the energy magnitude emanating from each voxel comprises applying a coherence process.

17. The method of claim 13 wherein evaluating the time aligned traces to obtain a measure of the energy magnitude emanating from each voxel comprises applying a correlation process.

18. The method of claim 1 further comprising repeating the elements of claim 1 at a later time to determine changes in said volume of the Earth's subsurface.

* * * * *